(12) United States Patent
James

(10) Patent No.: US 6,252,541 B1
(45) Date of Patent: Jun. 26, 2001

(54) LOW RCS TEST MOUNTS

(75) Inventor: Jesse Clopton James, Huntsville, AL (US)

(73) Assignee: McDonnell Douglas Corporation, St. Louis, MO (US)

( * ) Notice: Subject to any disclaimer, the term of this patent is extended or adjusted under 35 U.S.C. 154(b) by 0 days.

(21) Appl. No.: 08/987,225

(22) Filed: Dec. 9, 1997

Related U.S. Application Data

(60) Division of application No. 08/545,349, filed on Oct. 19, 1995, now Pat. No. 5,739,385, which is a continuation-in-part of application No. 08/273,576, filed on Jul. 11, 1994.

(51) Int. Cl.[7] .................................................. G01S 7/41
(52) U.S. Cl. .................................. 342/165; 342/4; 342/1
(58) Field of Search ................................ 342/1, 2, 3, 4, 342/165, 170, 171, 173

(56) References Cited

U.S. PATENT DOCUMENTS

| | | | |
|---|---|---|---|
| 4,725,490 | 2/1988 | Goldberg | 442/202 |
| 4,879,560 | 11/1989 | McHenry | 342/165 |
| 4,990,923 | 2/1991 | Delfeld | 342/165 |
| 5,229,773 | 7/1993 | Danwen et al. | 342/1 |

FOREIGN PATENT DOCUMENTS 141598   11/1947   (AU).

OTHER PUBLICATIONS

Condon, Handbook of Physics, pp. I–54 to L–56 and p. 6 of Index.

Primary Examiner—John B. Sotomayor
(74) Attorney, Agent, or Firm—Alston & Bird LLP

(57) ABSTRACT

Novel test mounts are defined for a radar cross section testing apparatus that allows a supported object to be tested without interference from the test mount. This includes prescribing a diameter of about 0.61 wavelegths for a cylindrical test mount; maintaining a ratio for the test mount's characteristic dielectric constant and magnetic permeability of about one; and/or installing a frequency transposing apparatus to convert the frequency of radar pulses directed toward the test mount to off-frequency echoes.

10 Claims, 4 Drawing Sheets

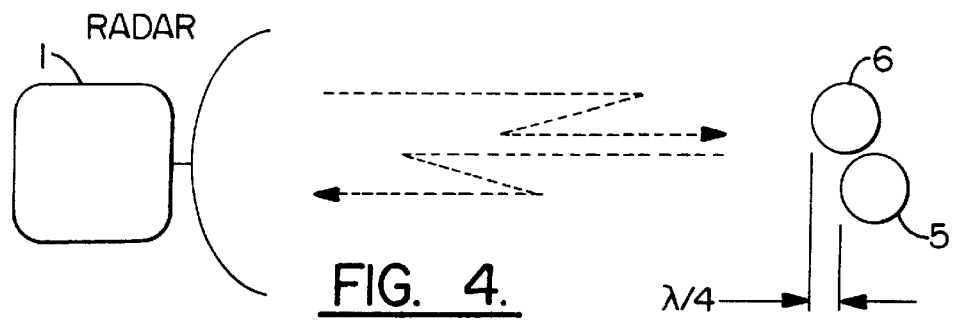
FIG. 4.
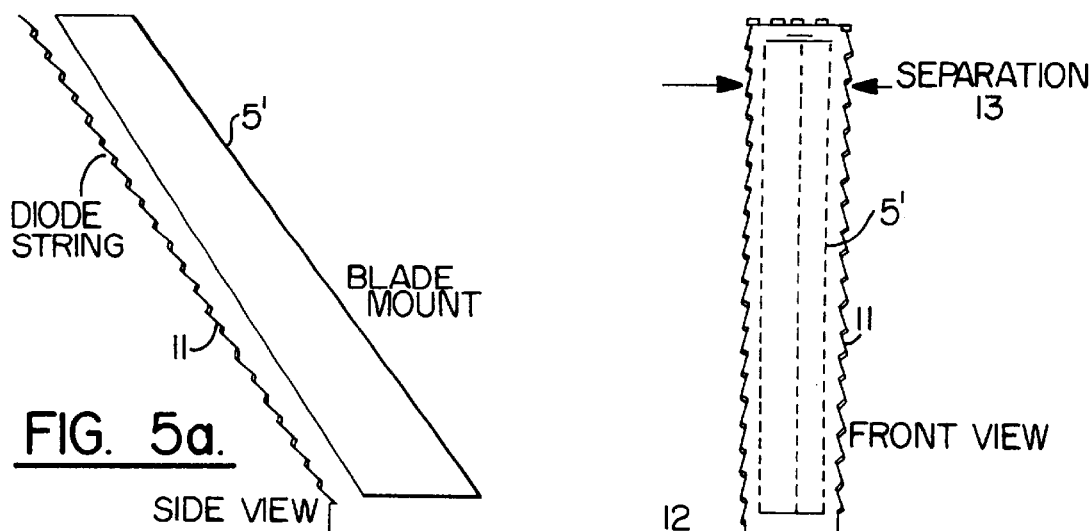
FIG. 5a.
FIG. 5b.
FIG. 5c.

LOW RCS TEST MOUNTS

This application is a divisional of Ser. No. 08/545,349 filed Oct. 19, 1995 now U.S. Pat. No. 5,739,385 which is a continuation in art of my earlier filed application, Ser. No. 08/273,576, filed Jul. 11, 1994, entitled Synthetic Aperture Radar Smearing, now allowed, for which the benefit of 35 U.S.C. 120 is claimed.

FIELD OF THE INVENTION

This invention relates to radar testing apparatus and, more particularly, to novel low radar cross section test mounts used to hold parts undergoing radar exposure in a radar cross section testing apparatus.

BACKGROUND

The development of stealth radar techniques requires measurement of any newly developed stealth object, such as a missile, vehicle or airplane wing, to determine the object's design effectiveness in minimizing reflection of incident radar energy. Those measurements are customarily made on radar cross section ranges. Such ranges basically consist of a test radar that sends radar signals to a remotely positioned test target, the stealth object, and receives and measures any returned radar echo, as may be reflected from the object.

Typically the test target is supported upon an RCS test mount and is continuously exposed to the radar signals. The mount slowly rotates the stealth object through 360 degrees while the test radar continuously measures the radar cross section. An ultimate goal, perhaps unattainable, of stealth design procedure is for the stealth object to avoid reflecting any echo whatsoever. As progress toward that end is made, a problem caused by the test mount arises.

When the radar cross section of the stealth object is very low, the mount used to support the stealth object during the test may have a larger cross section than the stealth object. Such a consequence may result even when the test mount is fabricated of an electrically non-conducting material, such as a dielectric. To the present none of the testing apparatus has means to permit one to distinguish between the echo from the target object and the echo from the test mount. This dilemma becomes more acute as stealth design techniques are improved and very low cross section targets are presented for measurement.

Several kinds of test mounts are found in present use. Steel mounts, resembling a knife blade in shape, are used for heavy test targets. The knife edge points toward the radar and is stationary. A motor, located at the top of the mount, rotates the test target. As might be expected, that kind of test mount does not have a low cross section.

Other mounts, available in many shapes, are fabricated of foamed plastic, particularly a material having a small dielectric constant and low reflectivity. These foam mounts also do not have a very low radar cross section. A motor below the surface of the ground rotates both the mount and the test target. For very low cross section test targets, the test target is suspended from a super structure by plastic strings, much like that for suspending a puppet. The super structure, however, is very inconvenient. Moreover, it is very difficult to control the orientation of the test target with the latter mount.

An object of the present invention therefore is to provide a very low radar cross section test mount for radar test ranges. Another object of the invention is to provide a very low radar cross section test mount that is relatively easy to use and is of a relatively simple structure.

SUMMARY OF THE INVENTION

In accordance with the present invention low radar cross section test mounts are attained in several alternate embodiments. In a first embodiment the test mount is fabricated of a dielectric material that is of a dielectric constant, $\epsilon$, and a magnetic permeability characteristic, $\mu$, such that $\epsilon$ is essentially equal to $\mu$. In other words, the ratio of $\epsilon$ to $\mu$ is essentially one. In a second embodiment, the test mount is a right circular cylinder of approximate diameter 0.61 wavelengths of the radar frequency and is constructed from a dielectric having a very low $\epsilon$. In a third embodiment, a novel frequency transposing shield system is interposed between the radar transmitter and the test mount, whereby reflections or echoes occur displaced in frequency from that of the radar transmitter enabling the echo from the object under test to be distinguished from that reflected by its supporting test mount.

The foregoing and additional objects an advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the Drawings:

FIG. 4 illustrates two identical foam column mounts placed one fourth wavelength apart whereby a reflection from one column cancels the reflection from the other;

FIGS. 5a, 5b and 5c illustrate the use of diode strings to shield blade mounts when the polarization is vertical;

DESCRIPTION OF THE PREFERRED EMBODIMENTS

Figure 1:
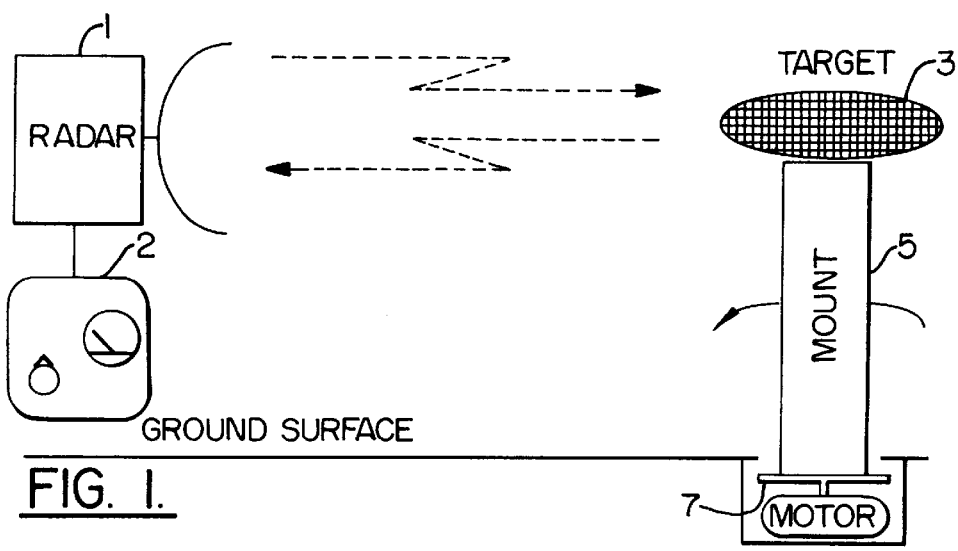
FIG. 1 illustrates an embodiment of a test mount within a radar cross section testing system.

As illustrated in FIG. 1, a typical radar cross section measurement system found in a radar cross section range, includes a radar system 1 spaced a distance from a test target 3, an object, such as a wing member or aileron, whose radar cross section is to be measured and quantified for other purposes, not here relevant. The radar system includes a radar transmitter and appropriate measurement apparatus. Target 3 is supported atop a test mount 5, which, in accordance with an embodiment of the present invention, is suitably a solid circular cylinder in geometry. In turn, test mount 5 is supported by a rotatable table 7, symbolically illustrated in the figure, capable of rotating the target through 360 degrees, which permits the target to be presented at different orientations to the radar.

In conventional practice the radar illuminates the target with radar signals and receives the echo that is reflected therefrom, and, incidentally, from the test mount as well. The received echo is evaluated by appropriate measurement apparatus associated with the radar system, as symbolically represented by measuring device 2.

In testing, test mount 5 is turned by the rotating table through 360 degrees, while the radar system continues to illuminate the target. Changes in the radar cross section, which usually occurs with a change in target orientation, are detected by the radar system and is scrutinized by the operator who is performing the test. The foregoing test arrangement and apparatus, apart from the particular test mounts described herein, is entirely conventional and known.

For accurate measurement of the target, thus, it is apparent that radar echoes from the test mount should be minimized or eliminated, if possible. That is accomplished with the various embodiments of a test mount structure that are hereafter described in greater detail. Such low radar cross section test mounts include proper geometric shape and dimension, unique materials and even may be formed in combination with one that is of conventional structure that is combined with a novel frequency transposing shield system, depicted in dash lines 9 in FIG. 3.

Figure 3:
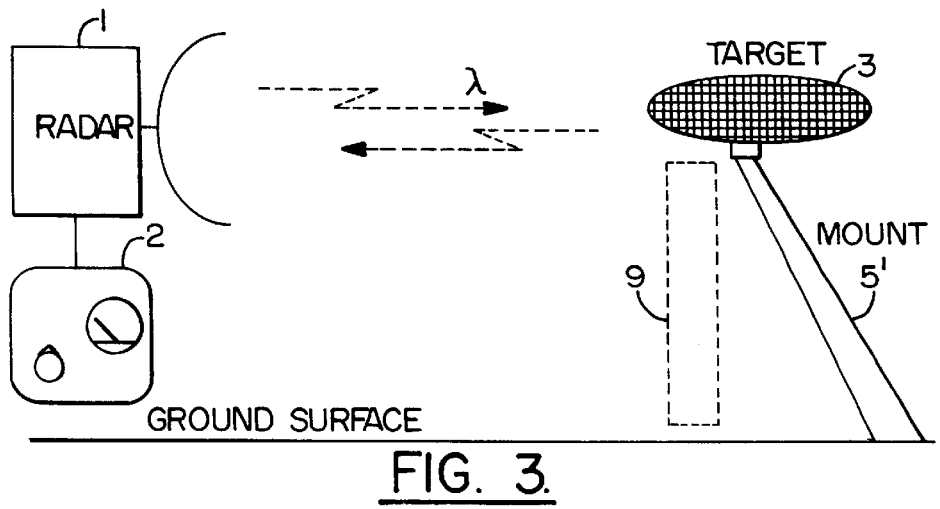
FIG. 3 symbolically illustrates an embodiment of a frequency transposing shield system for masking the test mount.

The mount 5' shown in FIG. 3 is a steel blade that is stationary; it does not rotate. The rotor is mounted on top of the blade. A knife edge of the blade points toward the radar. This type of mount is often used because it supports heavy targets that have large radar cross sections (abbreviated as "RCS"). The RCS of the blade mount is high, but this type mount is used only when the RCS of the target is high, thereby shadowing the effect of the blade's RCS. The shield system 9 is useful in this case, and is discussed in greater detail hereinafter. The shield system is not practical for other type mounts when the RCS of the mount is inherently very low.

Four novel methods for reducing the RCS of mounts are hereafter described. Briefly these are as follows: 1) An electronic shield; 2) a right circular cylinder with low e and of 0.61 wavelengths in diameter; 3) two such right circular cylinders spaced one fourth wavelength apart; and 4) a single such cylinder with magnetic loading. The fourth technique is considered as the first embodiment presented in the next paragraph.

A first embodiment of test mount 5, shown in FIG. 1, is formed in the geometry of a solid right circular cylinder formed of dielectric material. The dielectric material is of a dielectric constant, $\epsilon$, and has a magnetic permeability characteristic, $\mu$, such that $\epsilon$ is essentially equal to $\mu$. In other words, the ratio of $\epsilon$ to $\mu$ is essentially one. Desirably, this should be accomplished with a single material. However, a single material having the prescribed relationship is not known to the applicant. Instead, the material is formed by mixing two different materials to form a composite substance having the desired electrical qualities.

As example, the cylinder is molded from a base dielectric material which has a dielectric constant that is under 5.0. The dielectric material is heated for molding into the prescribed geometry. While the dielectric is in the molten state, a certain amount of magnetic powder, suitably a magnetic ferrite or iron oxide, as example, whose magnetic permeability is greater than 50, is added and the component ingredients are thoroughly mixed together to uniformly distribute the oxide within the melt. The mixture is then expanded into a solid foam using standard techniques and the solid foam is then cut into a cylinder to form the support. When solidified, the dielectric material has sufficient mechanical strength to support most objects whose radar cross section is to be measured.

Iron oxides, garnets, and nickel iron alloys are examples of appropriate materials having a high $\mu$. After mixing and foaming, the permeability is much less than that of the magnetic material in the state prior to foaming.

Both the $\epsilon$ and the $\mu$ of the dielectric cylinder should ideally be in the range of 1.02 to 1.1. Two phenomena of importance occur when the molten mixture is expanded as a foam. First, the foam is mostly air which has a dielectric constant of unity. The resultant e of the foam then will lie between unity and the dielectric constant of the solid or liquid material before foaming. Secondly, the magnetic permeability, $\mu$, of the foam will be much less than the permeability of the solid magnetic additive before foaming, and will depend strongly upon the shape and spacing of magnetic particles in the foam. For this reason the magnetic additive should preferably be in the form of thin strands rather than a powder. The ratio $\mu/\epsilon$ of the added magnetic material should be large to better ensure that the $\mu/\epsilon$ ratio for the foam is unity.

It is difficult as a practical matter to produce a foam that has a $\mu/\epsilon$ ratio of unity within the desired limits. Consequently, it is better to have two volumes of foam, one with $\mu/\epsilon$ slightly larger than unity and one with $\mu/\epsilon$ slightly smaller than unity. Two cylinders are cut from these two volumes of foam so that the heights of the cylinders are in inverse proportion to $\mu/\epsilon$ of each cylinder. As example, suppose $\mu/\epsilon$ for the first cylinder is 1.01 and for the second cylinder is 0.99. Then the heights of the two cylinders should be equal, except for one more factor. The illumination of the mount by the radar's antenna is usually not uniform. For a ground-plane test range and for the lower frequencies, the illumination intensity will increase linearly with height above the ground surface. In any case, the technician can compute or measure the intensity using a probe and standard techniques. Then the two component cylinders can be cut to approximate height, but preferably slightly oversize. Then with a further trial and error procedure the exact heights can be determined or tailored.

The two components are then stacked, one above the other. They are not glued, since the thin glue line would have a large radar cross section. As in all very low cross-section stealth design and practice, accuracy and attention to detail is important. A value of $\mu/\epsilon$ of 1.01 or less should be achieved, otherwise a foamed cylinder without magnetic loading and having an e of 1.01 can be produced more easily and have the same RCS.

Figure 2:
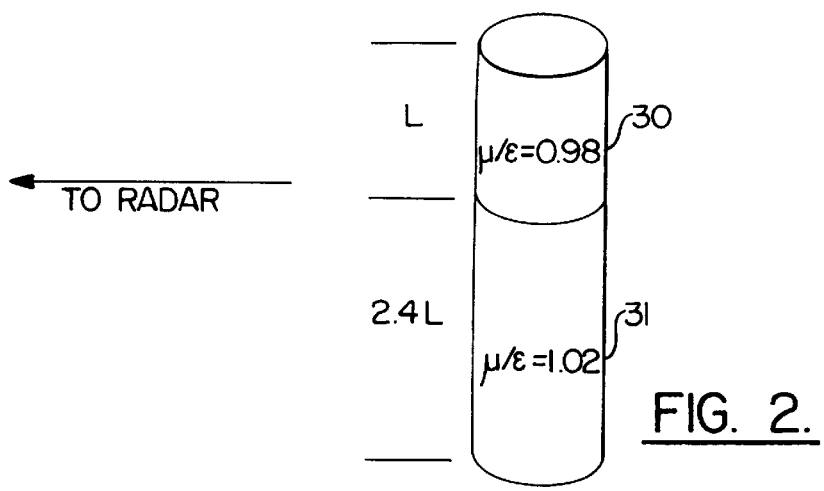
FIG. 2 symbolically illustrates a low reflectivity mount by virtue of magnetic permeability being made equal to the permittivity by using two foam columns.

An example of a foamed column having an effective $\mu/\epsilon=1$ is shown in FIG. 2. In this example the lower part of the right circular column has $\mu/\epsilon=1.02$, and the upper part has $\mu/\epsilon=0.98$. It is assumed that the illuminating power from the radar is linearly increasing from the ground up. The net effective $\mu/\epsilon$ of the column is unity because the reflected energy from each section of the column is equal but out of phase. In the example the length of the lower part of the column is 2.4 times the length of the upper portion. The power does not always linearly increase, so the adjustment in heighths of columns must be determined experimentally.

The radar cross section of the cylindrical mount is proportional to $f(\mu,\epsilon)$, which is defined as $$f(\mu,\epsilon)=[(\sqrt{\mu}-\sqrt{\epsilon})/(\sqrt{\mu}+\sqrt{\epsilon})]^2$$

When $\mu$ and $\epsilon$ are equal, the mathematical equation is zero as is the radar cross section. That relationship is difficult to achieve. In the practice of the invention the factor $f(\mu,\epsilon)$ should be as small as is reasonably practicable to attain. In accordance with the invention ratios within the range of 1.0 up to 1.01 should satisfy the requirement for low radar cross section.

For a second embodiment, a low radar cross section test mount can be fabricated of a dielectric as above, but without magnetic additives. In this embodiment the diameter of the right cylindrical shape is chosen to optimally be approximately equal to 0.61 wavelengths of the radar frequency, the derivation of which is discussed hereafter. Thus with a radar test frequency of 158 MHz, the diameter is 1.157 meters, as example. As those skilled in the art appreciate, larger diameters may be required in certain circumstances to support the target's weight.

Applicant has determined that the optimum diameter, D, for the mount is of a value that forces the Bessel Function of the first kind, J1(kD), to zero, where k is $2\pi$ divided by the wavelength, $\lambda$, of the radar signal in the mount. There are certain values of kD, referred to as the roots, that cause J1(kD) to equate to zero. Numerous mathematical, scientific and engineering handbooks contain tables of values and plots of J1(kD) versus kD to which reference may be made for assistance with any particular design. It is found that the smallest root of J1(kD) occurs when D is approximately 0.61 wavelengths. Accordingly a mount of that diameter has a very small radar cross section. As the radar frequency increases, larger values for D must be used in order that the mount have sufficient strength to support the object being tested. Other suitable values of D/$\lambda$ are 1.117, 1.619 and 2.12. There may be still others as well.

For right circular cylinders as mounts, the radar cross section is approximately equal to $f(\mu,\epsilon)[L\text{ kD }J1(kD)]^2\pi/16$, where L is the metric length of the cylinder. For very low radar cross section mounts, both $f(\mu,\epsilon)$ and J1(kD) should be made as small as practically possible.

As an example, a polystyrene foamed right circular mount with L=3 meters, D=1.16 meters, and $\epsilon$=1.02 could not be detected at 158 MHz by a radar on an RCS range having a −70 dBSM (decibels relative to one square meter) threshold sensitivity and using a bandwidth of 10 MHz. This mount could support a weight well in excess of 100 pounds.

Two right circular cylinders spaced one fourth wavelength apart would present an even smaller RCS. This arrangement is shown in FIG. 4 to which reference is made. FIG. 4 shows a top view of the radar and test mounts. The mounts are shown as 5 and 6. Mount 5 holds the target and rotates as radar measurements are made. Mount 6 does not rotate. It reflects an echo of the same magnitude and out of phase with the echo from mount 5.

When mounts 5 and 6 are identical, the echo return from the combination is zero at the wavelength $\lambda$ for which the mounts were constructed. When the diameters of mounts 5 and 6 differ slightly, the bandwidth of operation at a given threshold is increased. When reasonable care is taken in constructing the two cylinders, the RCS of the combination can be 10 dB (decibels) less than that for a single cylinder, or, for the same threshold, the bandwidth can be doubled.

The preferred form of the test mount depends upon the frequency of operation, the amount of weight to be supported, and the level of RCS expected. The right circular foam cylinder 0.61 wavelengths in diameter will suffice for many cases, especially when the frequency is low and the weight to be supported is small. The double cylinders would be used for lower cross sections, and the $\mu/\epsilon$=1 case for a right circular cylinder having a diameter of 0.61 wavelengths would be used for even lower cross sections. For higher frequencies or for heavy targets, a stronger mount than the foamed column must be used. The steel blade, earlier described, is an example. In this latter case, the mount can be shielded by using a special electronic switching device, which is next described.

The shielding device is a more complicated form of low RCS support, and is formed with a novel frequency transposing protective shield system of the kind described in my prior application for patent, Ser. No. 08/273,576, filed Jul. 11, 1994, entitled Synthetic Aperture Radar Smearing. Such system includes a shield that is arranged to protect or shield a test mount from the RF emitted from the radar. The shield's electrical characteristics, such as reflectivity, permittivity or permeability, influence incident RF pulses. Suitable control circuits or drivers to vary one or more of the shield's characteristics at a very high rate to modify the electronic characteristics of the RF pulses that are incident upon and are reflected by the shield system.

The shield's reflective characteristics are modulated in the presence of incident RF pulses originating from the test radar. Effectively this modulates the incident radar pulses to produce dual Doppler shifts of frequency, which are returned to the radar system as the echo. In this way the RF from the radar is effectively transposed in frequency to other frequencies, a frequency transposing shield system, enabling the measuring equipment in the testing system to distinguish the RF reflected from the test object from that reflected from the supporting test mount. With such a shield system the test mount may be formed of conventional structure, such as a support formed of aluminum or steel or other material that is capable of providing mechanical support for even heavy objects.

In one specific embodiment the shield consists of a double chain of solid state diodes spaced approximately one fourth wavelength in front of and parallel to the knife edge of a metallic mount. Such an arrangement for vertically polarized radio waves is shown in FIG. 5 to which reference is made. The steel mount is shown as 5', and the shield is shown as 11. Note that FIG. 5a is a side view and that FIGS. 5b and 5c are front views. The front view is the view that the radar sees. The shield consists of a loop of diodes placed between the mount and the radar.

In operation the diodes are alternately biased forward and backward, or on and off, by the square wave generator 12. When the diodes are on, current flows through the loop and the loop acts as a reflector of radar energy, allowing only a small amount of energy to reach the steel mount. When the diodes are off, most of the energy reaches the mount. The spacing of the diodes from each other along the chain is less than one quarter wavelength at the highest radar frequency to be used. At this spacing when the diodes are biased off, the radar "sees" a loop of short wires which are poor reflectors. When the diodes are biased on, the radar "sees" a long loop of wire which can be a strong reflector.

The loop of diodes in FIG. 5 is spaced one quarter or three quarters wavelength in front of (toward the radar) from the effective reflecting center of the blade mount. This reflecting center is usually near the knife edge. The location of the diode string must be placed experimentally, and the spacing will vary with radar frequency and with the mount design. Determining the spacing is a trial and error procedure. The string is moved back and forth until a spacing is found that makes the RCS a minimum.

The loop of diodes should shield the mount when the diodes conduct. For this reason the separation of strands of the loop should be less than one half wavelength, and when the width of the mount is large, two or more loops may be required to form a shield. FIG. 5b shows separation 13 for the case of a narrow blade mount. The separation 13 should be less than one half wavelength to prevent an appreciable amount of radio energy from reaching the mount 5' when the diodes are conducting. FIG. 5c shows separation 14 for the case of a broad blade mount, and to keep the separation of the individual strands of diodes less than one half wavelength, there must be four or more strands as shown in FIG. 5c. Separation 14 is larger in terms of wavelengths than separation 13.

Figure 6A:
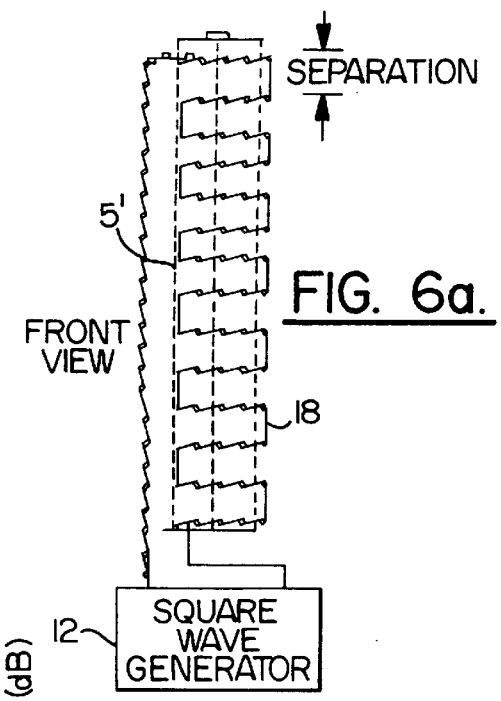
FIGS. 6a and 6b illustrate the use of diode strings and diode grids to shield blade mounts when the polarization is horizontal or circular.
Figure 6B:
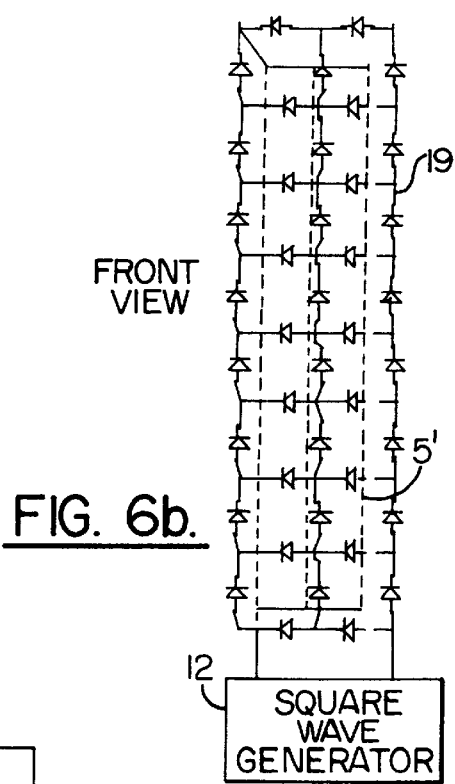

FIG. 5 was for the case of vertical polarization. For horizontally polarized radar waves the strands of diodes should be horizontal as indicated by 18 in FIG. 6a. FIG. 6b shows a grid of diodes 19 that serve both vertical and horizontal polarizations. The return path for the diode bias voltage is through the steel blade mount 5' in this case as an example. The return path could instead be via a single strand of diodes like that shown in FIG. 5a as an example.

The reflection from the diode string may be larger than the reflection from the naked mount. In this case the square wave generator can be modified so that the diode on-time is smaller than the off-time, with the ratio of on-to-off times being equal to the square root of the ratio of mount-to-diode-string cross sections. When these ratios are smaller than about one fifth, the cross section of the diode string must be decreased by adding resistance or reactance to the string. This process should also be accomplished experimentally for each mount.

When the reflections from the blade mount and the diode string are equal in magnitude and the square wave generator 12 is pulsing the diodes on and off at frequency f, the resulting echo from the combination will principally be two frequency components separated f in frequency. The radar receiver filters out these two components. The end result is less received energy in the usable passband which is equivalent to a smaller mount cross section.

Figure 7:
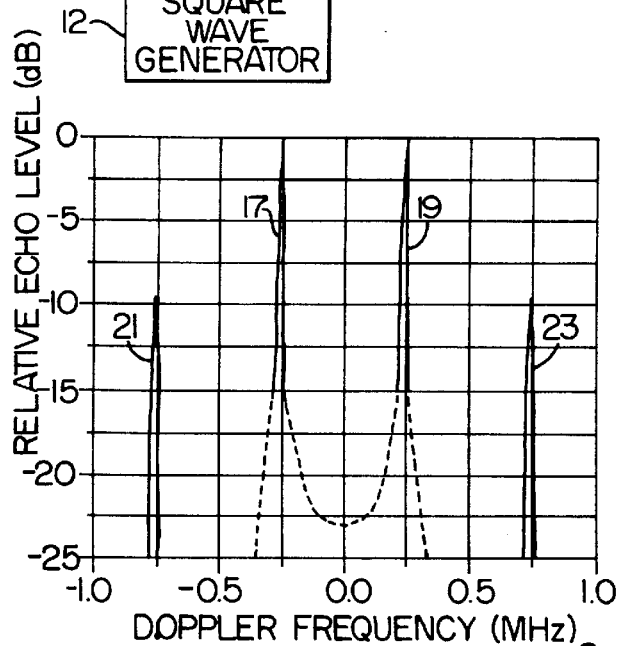
FIG. 7 graphically illustrates the radar echo's Doppler frequencies produced in operation of the embodiment of FIG. 5.

The spreading of the echo into two principal frequency components is illustrated in FIG. 7 for the case of a switching frequency of 500 KHz. In this ideal case the two principal sidelobes are 17 and 19 each separated 250 KHz from the frequency of the incident radar pulse. The first sidelobes are always separated by the modulation rate. There are also weaker sidelobes shown as 21 and 23 in FIG. 7.

Figure 8:
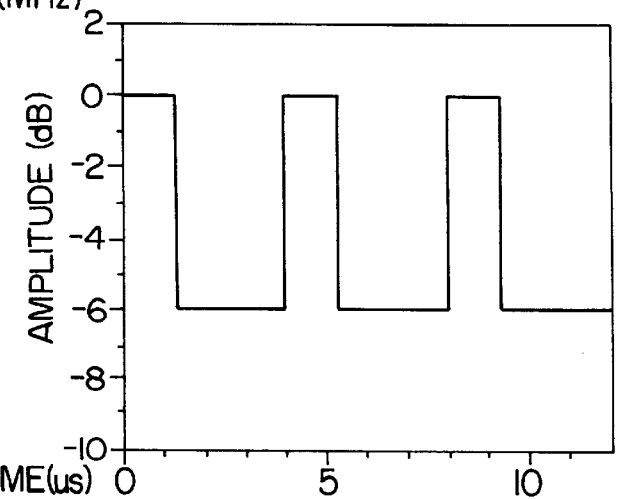
FIG. 8 illustrates a preferred echo waveform in the operation of the frequency transposing shield system of FIG. 5.

When the reflections from the mount and the diode string differ by 6 dB (factor of four in power) the spectrum shown in FIG. 7 can still be obtained by adjusting the on and off times of the diode string as shown in FIG. 8 as an example. FIG. 8 shows an amplitude difference of reflected signals to be 6 dB and an on and off time scale that corrects for the 6-dB discrepancy. Note that the on time (or off time) differs from the off time (or on time) by a factor of two. When the reflection from the diode string is 6 dB larger than the reflection from the mount, the diode on time should be one half the off time. When the reflection from the diode string is 6 dB smaller than the reflection from the mount, the diode on time should be twice as long as the off time.

Figure 9:
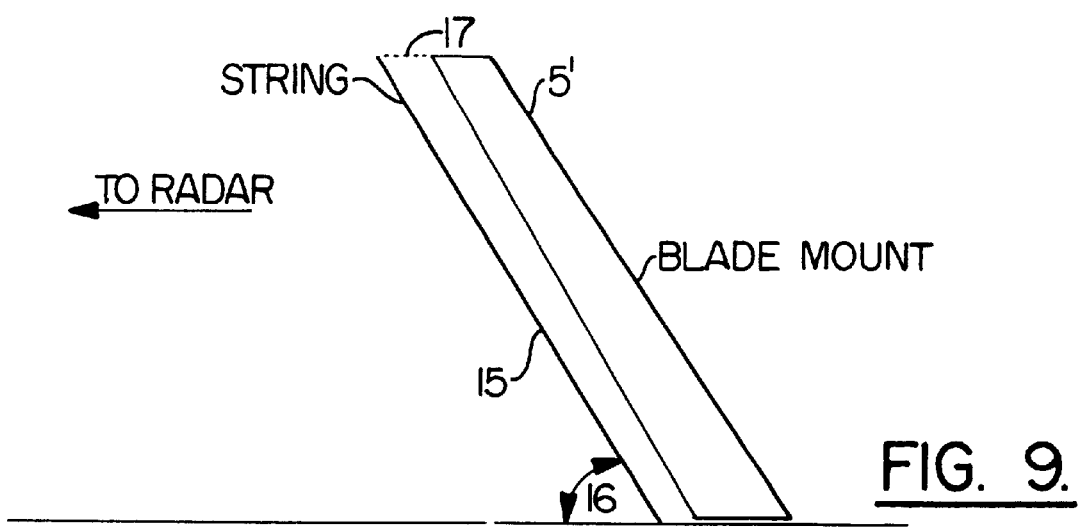
FIG. 9 shows the use of a simple string or wire to decrease the radar cross section of a blade mount.

The cross section of some low cross section blade mounts can be decreased somewhat, typically a factor of ten, by the simple addition of a plastic string, such as a one-eight inch diameter polyethylene, located one quarter wavelength in front of the effective reflecting center of the blade mount. This arrangement is illustrated in FIG. 9 to which reference is made. The string diameter, and the location and angle of the string with respect to the blade mount, will vary with frequency and the string must be placed experimentally using a trial and error procedure. This technique can be effective at any frequency, but at lower frequencies such as VHF, a thin conducting wire instead of a dielectric string should be used. This technique works when the radar cross sections of the blade mount and the string are equal in magnitude but out of phase. The out-of-phase condition is achieved by proper placement of the string, which can be in front of the blade mount as shown in FIG. 9, behind the blade mount, or even to one side of the blade mount. The angle 16 that the string makes with the ground must be determined experimentally for each mount and each frequency. The string is attached to the top of the mount using a small plastic rod 17.

For additional description of the foregoing frequency transposing devices, reference is made to the prior application, Ser. No. 08/273,576, filed Jul. 11, 1994, entitled Synthetic Aperture Radar Smearing, the content of which is incorporated herein by reference.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A low radar cross section test mount for holding an object in a measuring apparatus of the kind that measures the radar cross section of said object, including exposing said body to a radar signal of a predetermined frequency and wavelength, comprising:

post means for holding an object for test;

frequency transposing modulation means for transforming oncoming radar pulses directed toward said post means into at least two radar echoes that are shifted in frequency above and below said predetermined frequency of said oncoming radar pulse to substantially minimize reflection at said predetermined frequency of said oncoming radar pulses.

2. The invention as defined in claim 1, wherein said post means includes a reflecting center and wherein said frequency transposing modulation means further comprises:

a diode loop formed of a plurality of electrical diodes with said diodes in said loop being spaced from one another by less than one fourth of said wavelength of said radar pulses;

said diode loop being spaced from said reflecting center of said post mount in the direction of said radar to shield said mount; and driver energy source means for providing on and off signals to the string of diodes to alternately render said diode loop electrically conducting and non-conducting.

3. The invention as defined in claim 2, wherein said predetermined spacing distance between the reflecting center of said post means and said diode loop comprises a distance equal to N wavelengths of said radar signal, wherein N comprises the fraction selected from the group consisting of: ¼ and ¾.

4. The invention as defined in claim 3, wherein said post means exhibits a predetermined radar cross section and wherein said diode loop exhibits a radar cross section that is approximately equal in magnitude to said radar cross section of said post means.

5. The invention as defined in claim 4, wherein said diode loop further includes a plurality of electrical wire means for connecting respective diodes in electrical series circuit, each said wire means exhibiting a electrical resistance; and further including:

resistance adjusting means for adjusting the electrical resistance of said wire means to adjust said radar cross section exhibited by said diode loop.

6. The invention as defined in claim 4, further including:

diode adjusting means for altering the number of diodes in said plurality of diodes to adjust said radar cross section exhibited by said diode loop.

7. The invention as defined in claim 1, wherein said frequency transposing modulation means includes:

means for varying the effective distance between the source of said radar signals and said target at a rapid alternating rate, said rapid alternating rate being typically less than ten MHz in frequency.

8. Apparatus for holding an object in a measuring apparatus of the kind that measures the radar cross section of said object, including radar means for exposing said body to a radar signal of predetermined wavelength, comprising;

first and second test mounts for jointly supporting said object, said test mounts being of identical structure; each of said first and second test mounts being spaced from said radar, with said first mount being spaced at a greater distance from said radar than said second mount, said greater distance being one fourth wavelength greater than the spacing of said second mount.

9. Apparatus for holding an object in a measuring apparatus of the kind that measures the radar cross section of said object, including radar means for exposing said body to a radar signal of predetermined wavelength, comprising;

a test mount for holding said object, said test mount having an effective axis of reflection to said radar signals and exhibiting a certain radar cross section;

elongate cylindrical shaped reflector means having a predetermined length, diameter and reflectivity characteristic; said elongate cylindrical shaped reflector means being located spaced by one fourth wavelength from said axis of reflection and oriented in parallel with said axis of reflection; and said elongate cylindrical shaped reflector means having a radar cross section equal to said radar cross section of said test mount.

10. The invention as defined in claim 9, wherein said elongate cylindrical shaped reflector means comprises an electrical wire.

* * * * *

UNITED STATES PATENT AND TRADEMARK OFFICE
CERTIFICATE OF CORRECTION

PATENT NO.    : 6,252,541 B1  
DATED         : June 26, 2001  
INVENTOR(S)   : James Page 1 of 1

It is certified that error appears in the above-identified patent and that said Letters Patent is hereby corrected as shown below:

Title page,  
Item [60] Related Application Data, "No. 08/545,349, filed on Oct. 19, 1995, now Pat. No. 5,379,785" should read -- No. 08/450,349, filed on May 25, 1995, now Pat. No, 5,721,553 --.  
Item [56] References Cited, U.S. PATENT DOCUMENTS,  
Line 4, "Danwen et al." should read -- Dauwen et al. --.

Column 1,  
Lines 3, 4 and 5, "Ser. No. 08/545,349 filed Oct. 19, 1995 now U.S. Pat. No. 5,739,385 which is a continuation in art" should read -- Ser. No. 08/450,349 filed May 25, 1995 now U.S. Pat. No. 5,721,553 which is a continuation in part --.

Column 9,  
Line 9, "a" should read -- an --; last line after "comprising" the semicolon (;) should be a colon (:) --.

Column 10,  
Line 11, after "comprising" the semicolon (;) should be a colon (:).

Signed and Sealed this

Twenty-sixth Day of March, 2002

Attest:

JAMES E. ROGAN  
*Attesting Officer*    *Director of the United States Patent and Trademark Office*

UNITED STATES PATENT AND TRADEMARK OFFICE
CERTIFICATE OF CORRECTION

PATENT NO. : 6,252,541 B1 Page 1 of 1
DATED : June 26, 2001
INVENTOR(S) : James

It is certified that error appears in the above-identified patent and that said Letters Patent is hereby corrected as shown below:

Title page,
Item [60] Related U.S. Application Data, "No. 08/545,349, filed on Oct. 19, 1995, now Pat. No. 5,739,785" should read -- No. 08/450,349, filed on May 25, 1995, now Pat. No, 5,721,553 --.
Item [56] References Cited, U.S. PATENT DOCUMENTS,
Line 4, "Danwen et al." should read -- Dauwen et al. --.

Column 1,
Lines 3, 4 and 5, "Ser. No. 08/545,349 filed Oct. 19, 1995 now U.S. Pat. No. 5,739,385 which is a continuation in art" should read -- Ser. No. 08/450,349 filed May 25, 1995 now U.S. Pat. No. 5,721,553 which is a continuation in part --.

Column 9,
Line 9, "a" should read -- an --; last line after "comprising" the semicolon (;) should be a colon (:) --.

Column 10,
Line 11, after "comprising" the semicolon (;) should be a colon (:).

This certificate supersedes Certificate of Correction issued March 26, 2002.

Signed and Sealed this

Twelfth Day of August, 2003

JAMES E. ROGAN
*Director of the United States Patent and Trademark Office*